United States Patent
Krycki

(10) Patent No.: US 6,565,343 B1
(45) Date of Patent: May 20, 2003

(54) APPARATUS FOR PRODUCING PLASTIC FILM

(75) Inventor: Robert D. Krycki, Brampton (CA)

(73) Assignee: K & S Future Design Inc., Ontario (CA)

( * ) Notice: Subject to any disclaimer, the term of this patent is extended or adjusted under 35 U.S.C. 154(b) by 0 days.

(21) Appl. No.: 09/094,250

(22) Filed: Jun. 9, 1998

(51) Int. Cl.$^7$ .............................................. B29C 47/90
(52) U.S. Cl. .................. 425/72.1; 425/326.1; 425/377; 425/387.1; 425/392; 425/367
(58) Field of Search .......................... 425/72.1, 326.1, 425/387.1, 392, 367, 377, 139

(56) References Cited

U.S. PATENT DOCUMENTS

| | | | | |
|---|---|---|---|---|
| 3,002,430 A | * | 10/1961 | Voigt et al. ............... | 493/423 |
| 3,629,027 A | * | 10/1971 | Germain ................... | 156/167 |
| 3,700,365 A | * | 10/1972 | Spicer et al. .............. | 425/28 |
| 3,891,374 A | * | 6/1975 | Ninomiya et al. ........ | 264/209.2 |
| 4,338,088 A | * | 7/1982 | Buss et al. ................ | 414/794 |
| 4,976,907 A | * | 12/1990 | Brotz ....................... | 264/140 |
| 5,466,403 A | * | 11/1995 | Nissel ...................... | 264/39 |
| 5,912,022 A | * | 3/1996 | Sensen et al. ............ | 425/72.1 |
| 5,955,012 A | * | 10/1997 | Yingling et al. .......... | 264/40.5 |

* cited by examiner

Primary Examiner—Jan H. Silbaugh
Assistant Examiner—Donald Heckenberg
(74) Attorney, Agent, or Firm—Friedrich Kueffner

(57) ABSTRACT

Apparatus for producing plastic film, of the type in which molten plastic is extruded through an annular die to form a tubular bubble which is expanded by air blown into the bubble, and a collapsing frame for forming the bubble into a flat tube prior to passing the tube through a nip formed between rollers, in which opposed, converging reaches of endless belts are used for the collapsing. The belts have their upstream ends held by a pair of first rollers spaced apart on opposite sides of the bubble, and have their downstream ends held by a pair of nip rollers which hold the belts together to form a nip for the collapsed tube. Pulleys and a belt, or gears, are provided which rotatably interconnect the pinch rollers and ensure that the belts entering the nip travel at the same surface speed.

9 Claims, 5 Drawing Sheets

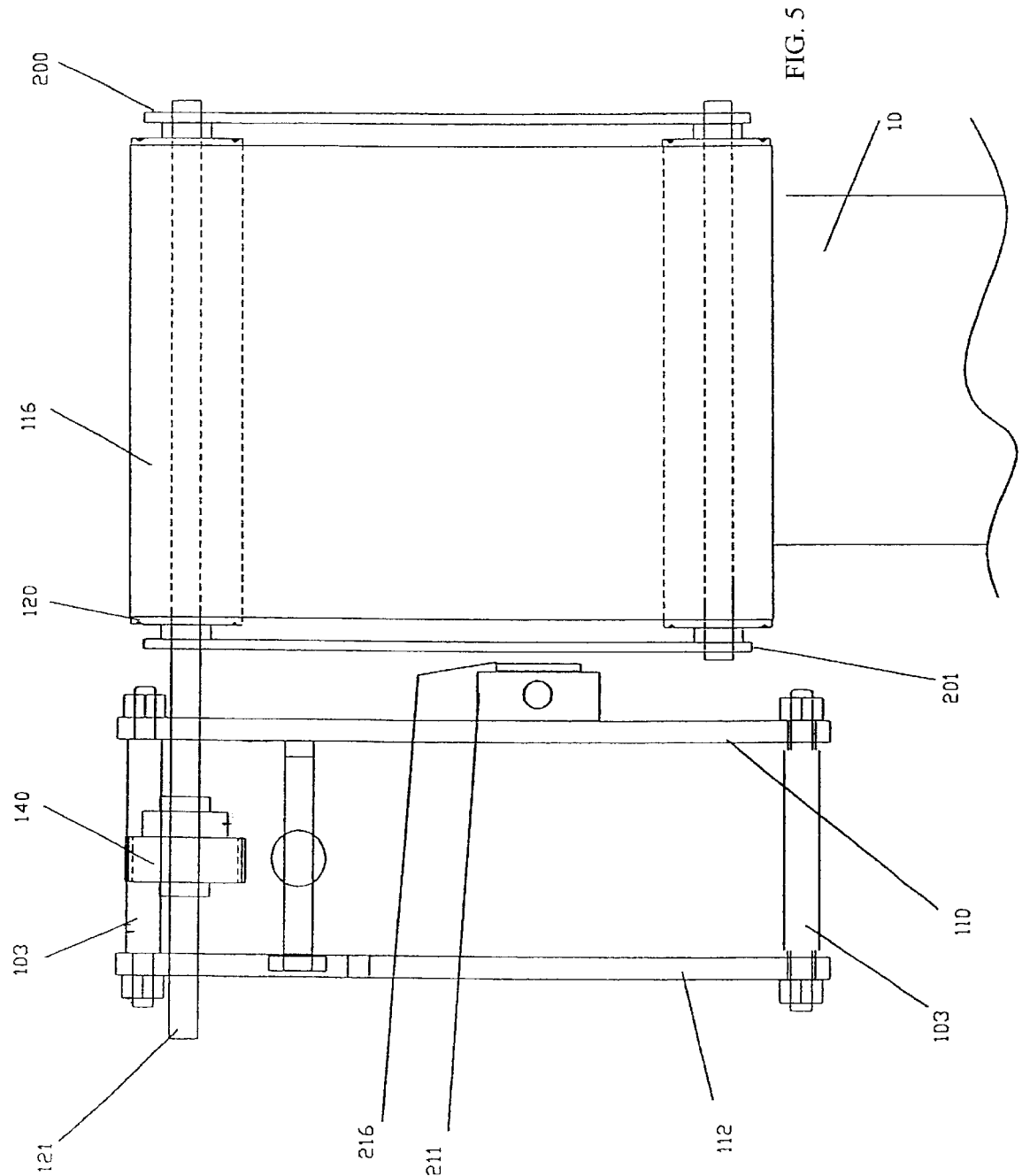

APPARATUS FOR PRODUCING PLASTIC FILM

BACKGROUND OF THE INVENTION

1. Field of the Invention

The present invention relates to apparatus for extruding blown plastic film. More particularly, it relates to means for collapsing a tubular bubble of blown plastic film.

2. Prior Art

All blown plastic film is extruded either vertically, up or down, or horizontally, from an annular die. Once the plastic or polymer leaves the die, it forms a tubular "bubble" and is drawn from the die by means of two rollers (usually known as "nip rollers") which contact a collapsed outer end of the bubble. As it leaves the die, the bubble is inflated with air by blowing means which supply air through the die, and once the requisite diameter has been reached inflation ceases and the air is trapped between the face of the die and the nip rollers.

When extruding blown film, the material in the form of a bubble is drawn from the die through the set of nip rollers, which are operated at variable speeds. This speed sets the final thickness of the film, which is dependent on how quickly the material may be drawn from the die. An apparatus commonly known as an air ring is mounted on top of the die. The air ring is designed to deliver a constant and precise flow of air from a pressure blower. This airflow reduces the temperature of the polymer sufficient to crystallise the molecules, which will set the final film diameter known as the freeze line or frost line.

Once the conditions are set, the bubble diameter is constantly being guided vertically through the bubble glides, and other guiding apparatus to the top nip. Immediately prior to the top nip, a set of collapsing frames mounted at an adjustable angle from the bubble diameter, at its entrance, to close to zero at the top, creates the transition of the bubble from cylindrical, to a tubular layflat sheet. This tubular layflat sheet is conveyed to the winding apparatus where the film can be rolled for further processing such as printing and bag making.

Current advances in technology including polymer chemistry, innovative cooling devices, and creative guiding devices, have resulted in increased extrusion or production speeds. With this combination of softer polymers and high extrusion rates, the collapsing frame technology, prior to the top nip has been a limiting factor, unable to handle the increased flow rates, resulting in deformed layflat sheet, creating unacceptable quality and reduced production rates of the finished product. Numerous methods have been tried to minimize this problem. Examples include Teflon roller collapsing frames, air collapsing frames, air tables, and tendency roller collapsing frames, all of which have had limitations, in either lack of quality or reduction in production capabilities.

Various so-called collapsing frames have been used in the prior art for guiding and collapsing the tubular bubble before it passes into the nip between the pinch rollers. Such frames originally consisted of wooden slats, rollers either driven or idle and driven by the film, "Teflon" (Trademark) rollers or beads, or bars or strips having air outlets to minimize contact with the soft plastic film. One problem with the usual types of collapsing frame is the difficulty of providing a smooth transition across the gap which exists between the outer end of the frame, where the transverse dimension of the tube is smallest, and the roller nip. This gap allows the film to expand slightly, under the pressure of air, and this in turn tends to cause wrinkles as the film is drawn into the nip.

Proposals have been made for using converging belts to provide, in effect, a part of the collapsing frame. So far as Applicant is aware, such proposals have not been adopted in practice. The problem with using converging belts is that any slight discrepancy between the surface speed of the belts will cause wrinkles as the blown tube enters the nip. The present invention overcomes this problem.

SUMMARY OF THE INVENTION

The present invention endeavours to provide an improved film-collapsing device. The device combines a collapsing frame and top nip assembly in order to overcome the quality and yield problems, blow film processors currently encounter, associated with the processing of newer softer polymers and the requirement for higher extrusion rates. This provides a means to control and optimize the collapsing frame's operating parameters.

The present invention, utilizes two conveyors which converge and encompass the top nips. Rather than as conventionally occurring in two stages, the collapsing process occurs in one continuous flow. Collapsing from round to flat, the centre of the layflat tube moves with the conveyor while the outside of the tubular film will not drag, but will systematically be laid down on the surface of the conveyors. The upper drive rollers of the conveyors form the top nip.

The present invention endeavours to mitigate the following problems:
wrinkling during collapse;
use of expensive additives;
friction between top nip and collapsing frame;
film stretch between top nip and collapsing frame;
small collapsing angles (less than 30°); and
low production speeds.

In accordance with this invention, apparatus for producing plastic film of the type described, and having means for collapsing the bubble into a flat tube prior to passing the tube through a nip formed between rollers, is characterized in that the collapsing means includes opposed reaches of endless belts having their upstream ends held by a pair of first rollers spaced apart on opposite sides of the bubble, and having their downstream ends held by a pair of nip rollers which hold the belts together to form a nip for the collapsed tube; and in that drive means are provided which rotatably interconnect the pinch rollers and ensure that the belts entering said nip travel at the same surface speed.

The drive means may include a pulley mounted to rotate with each of the pinch rollers, and a single drive belt having an inside surface frictionally driving a first of the pulleys and having an outside surface frictionally driving the second of the pulleys. Alternatively the drive means may include a gear wheel mounted to rotate with each of the pinch rollers, the gear wheels being of the same size and meshing with each other to ensure that the pinch rollers rotate at the same speed.

The terms "nip roller" and "pinch roller" are used interchangeably in the description that follows.

BRIEF DESCRIPTION OF THE DRAWINGS

Preferred embodiments of the invention will now be described by way of example with reference to the accompanying drawings, in which;

FIGS. 4 and 5 show views similar to FIGS. 2 and 3 of a third embodiment of collapsing frame.

DETAILED DESCRIPTION

Figure 1:
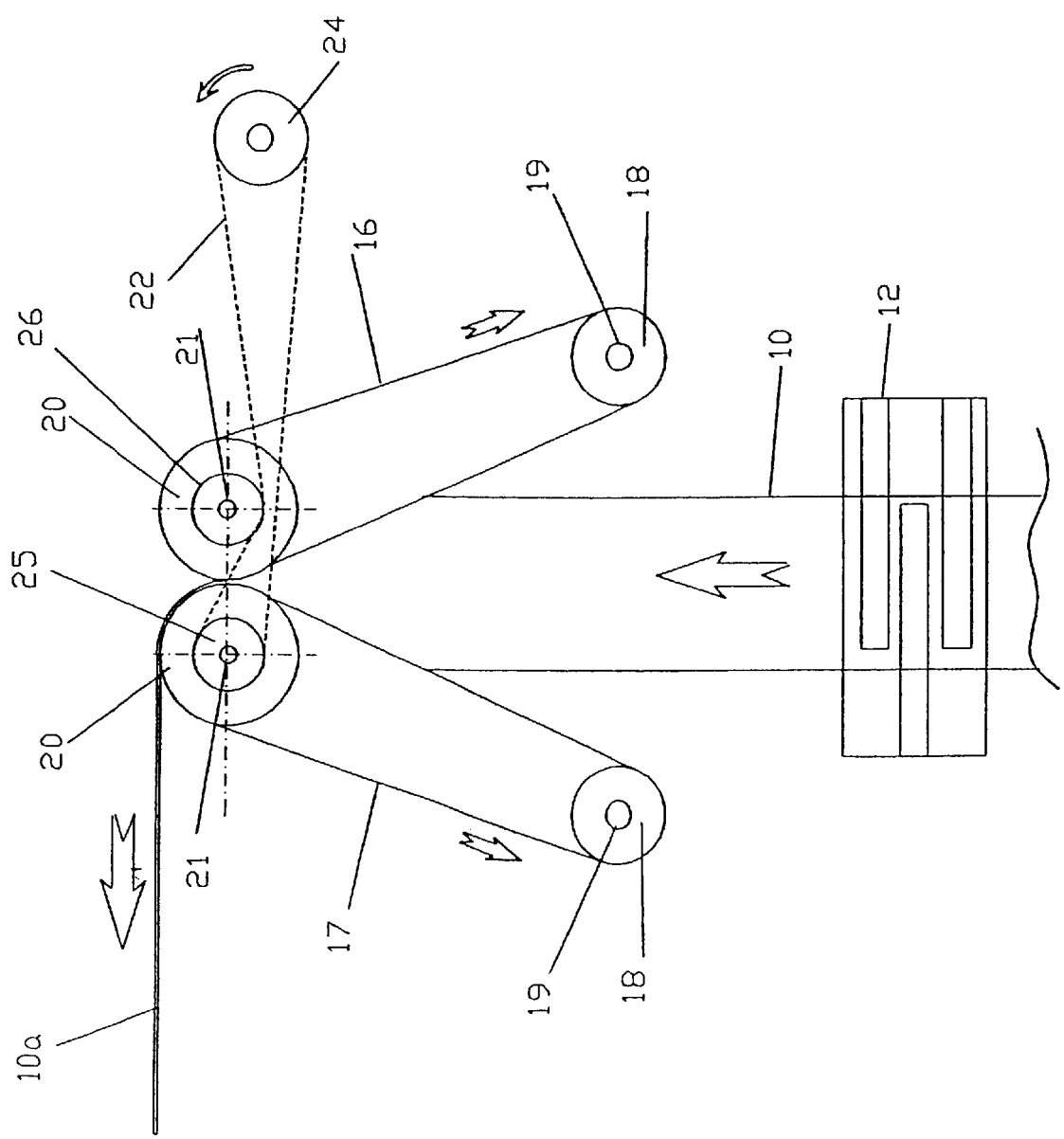
FIG. 1 shows a side elevation of a first bubble guide unit and collapsing frame in accordance with the invention.

FIG. 1 shows an upper portion of apparatus for upwardly extruding plastic film to form a tubular, generally cylindrical bubble 10. The extrusion apparatus, not shown, is of conventional form, and includes an annular die with means for extruding molten plastic through the die and blowing means for supplying air into the bubble. The size and shape of the bubble may be controlled by a cooling ring, and stabilized by a so-called bubble guide or cage 12, also of known form.

In accordance with the invention, there is provided, downstream of the bubble guide 12, a collapsing means provided by opposed converging reaches of two belts 16 and 17. The upstream ends of the two belts are held by a pair of first rollers 18 spaced apart on opposite sides of the bubble 10 and mounted on roller shafts 19. The downstream, or upper, ends of the two belts are held by a pair of nip rollers 20, of considerably larger diameter than the rollers 18, and which are between the belts as they pass around these rollers 20. The flattened tube 10a is drawn off from one side of the pinch rollers. The belts 16 and 17 are driven at the same surface speed to provide a gradually converging inlet into the nip in which there is no uncontrolled expansion of the bubble and substantially no wrinkles.

Both the rollers 20 are positively driven, how being a matter of design choice, but as shown here by means of pulleys 25 and 26 mounted on the same pinch roller shafts 21 as the rollers and which rotate with the rollers. Both of these pulleys are driven by a single drive belt 22 (or by two timed independent drives) having an outer loop portion which passes around drive pulley 24. The belt 22 has an inside surface frictionally driving the first pulley 25 and an outside surface frictionally driving the second pulley 26, so that both pulleys are driven at precisely the same speed by the belt. This arrangement ensures that the pinch rollers 20 are driven at the same surface speed, and that the plastic film 10 is not wrinkled as it passes between the rollers.

Figure 2:
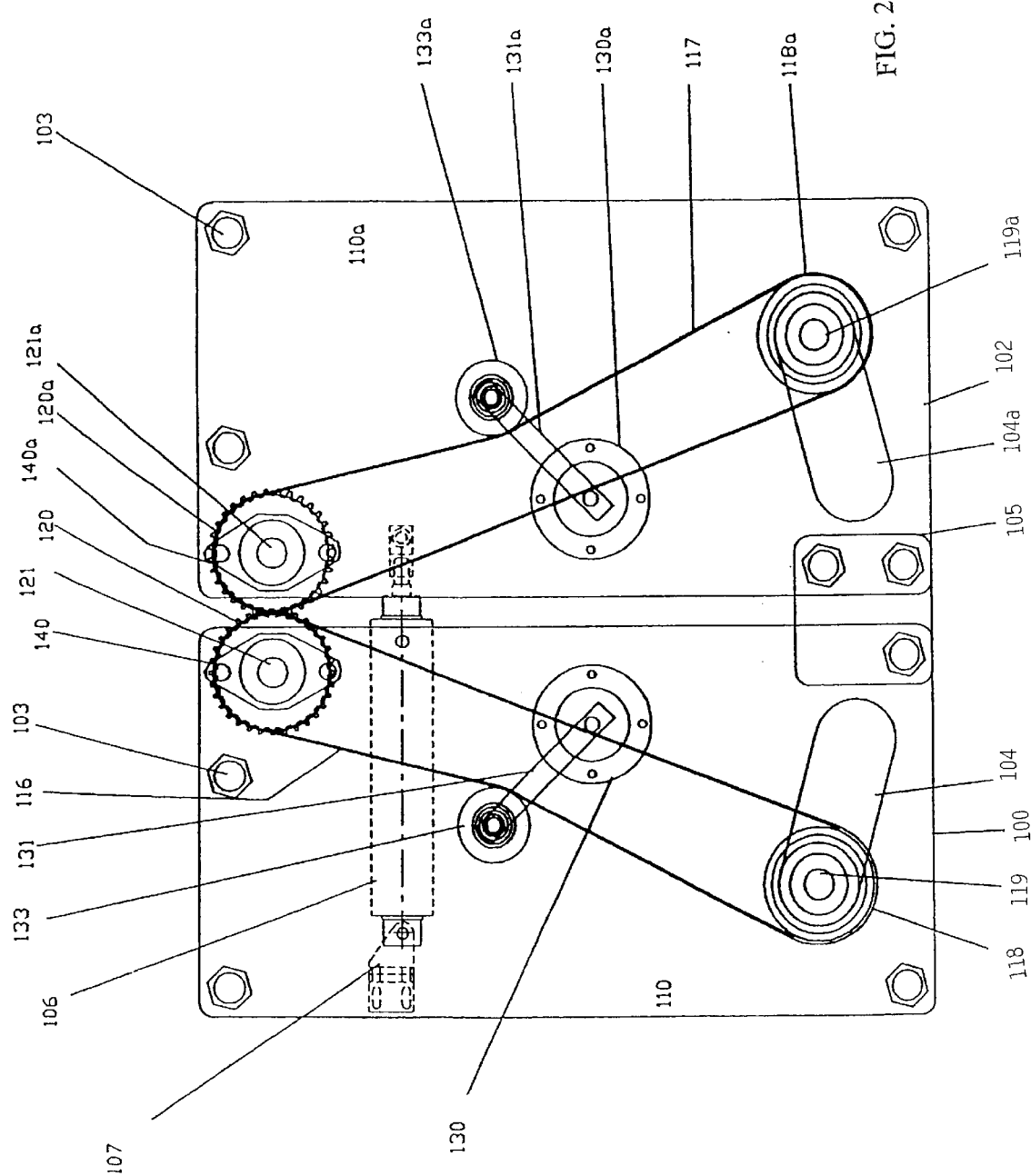
FIG. 2 shows a similar view of a second collapsing frame in accordance with the invention.
Figure 3:
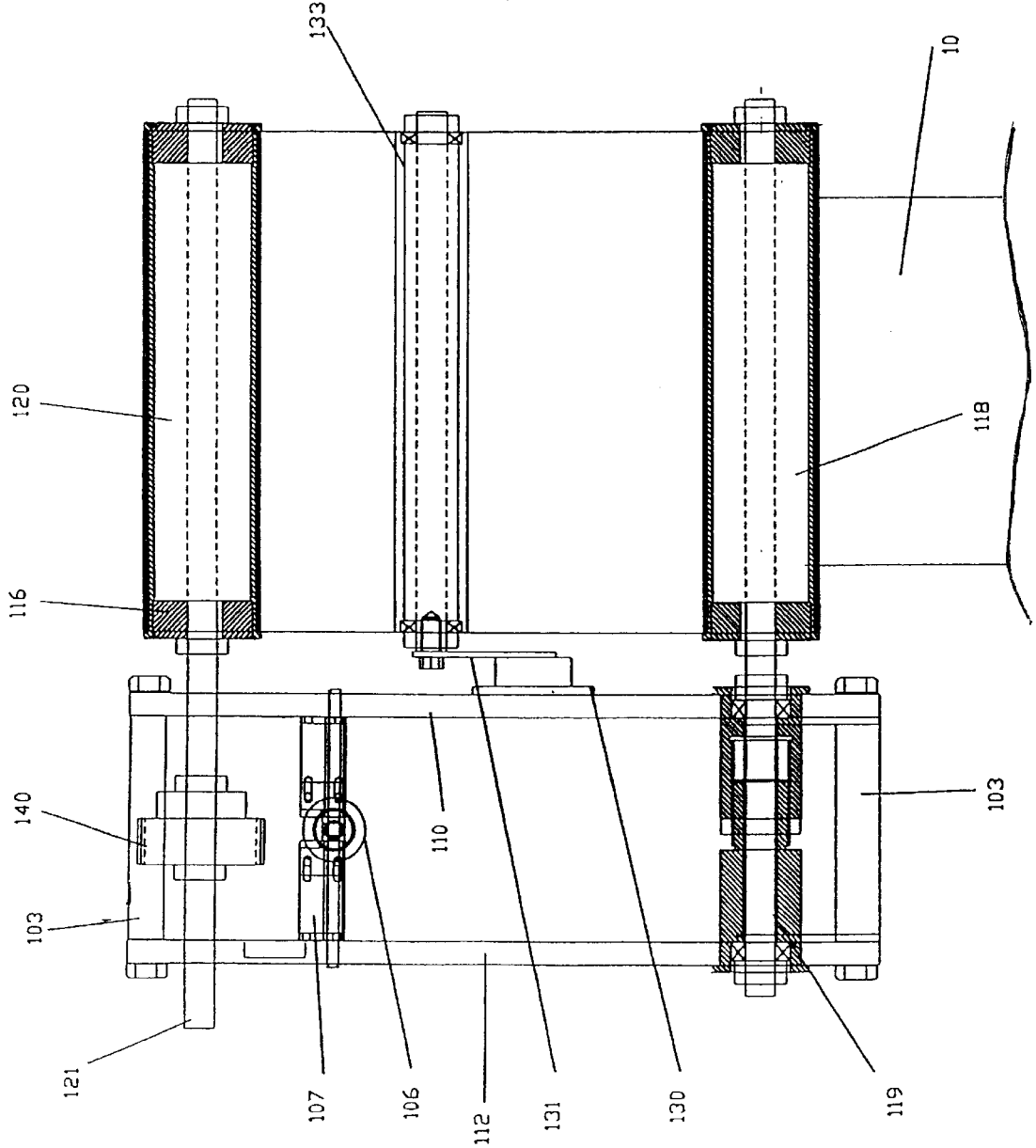
FIG. 3 shows a view on lines 3—3 of FIG. 2 of the second collapsing frame.

FIGS. 2 and 3 show a variation of the arrangement which uses gears instead of pulleys to maintain the relation between the speeds of the pinch rollers; these figures also show mounting arrangements for the belt rollers.

Referring to FIGS. 2 and 3, a fixed support 100 has front and back plates 110 and 112 held spaced apart by pillars 103. The plates between them support the shaft 119 of a first roller 118 and a pinch roller shaft 121 of a pinch roller 120. Shaft 119 is an idler shaft, while shaft 121 extends out through the back plate 112 to drive means not shown. Shaft 119 is adjustable in position in adjusting slot 104. Both shafts are supported preferably in cantilever fashion, the respective rollers being held outside the support with their inner ends spaced slightly from front plate 110. The latter plate also carries a fixture 130 for a spring biassed arm 131 which holds the shaft of a tensioning roller 133, but which may be dispensed with. The two rollers 118 and 120 hold respectively the upstream and downstream ends of an endless belt 116 which is tensioned by the roller 133.

A movable support 102 has a front plates 110a similar to plate 110 and a back plate (not shown) similar to plate 112. The movable support 102 is connected at a lower corner to the fixed support 100 by a pivot 105 (which, however, may be dispensed with), and the supports are also connected near their upper ends by a pressure fluid cylinder 106, specifically a pneumatic cylinder. A relatively fixed end of this cylinder is mounted on the fixed support by a bracket 107 extending between the front and back plates 110 and 112, while a relatively movable end of the cylinder is connected to a bracket which joins the front and back plates of the movable support 102. The pneumatic cylinder 106 may be an electric or air motor for moring plates 100 and 102 by either pivoting or horizontal displacement by sliding one or both plates.

The front plate 110a and back plate of the movable support between them support the shaft 119a of a first roller 118a and a pinch roller shaft 121a of a pinch roller 120a. Both shafts 119a and 121a are supported in cantilever fashion in the same manner that the shafts 119 and 121 are supported, the shaft 119a being adjustable in slot 104a. The front plate 110a carries a fixture 130a for a spring biassed arm 131a which holds the shaft of a tensioning roller 133a. The two rollers 118a and 120a hold respectively the upstream and downstream ends of an endless belt 117 which is tensioned by the roller 133a. This belt cooperates with the belt 116 so that, as in the first embodiment, the opposed inner reaches of the belts can contact opposite sides of a tubular, air inflated plastic bubble (shown at 10 in FIG. 3) to collapse it and pass it between the nip rollers 120, 120a. The tensioning rollers 133 and 133a are positioned on the outer reaches of the belts away from the bubble.

This embodiment also has means for ensuring that the nip rollers move the belts 116 and 117 at precisely the same speeds. These means include gear wheels 140, 140a mounted on the respective nip roller shafts 121, 121a between the front and back plates of these supports to rotate with the nip rollers. These gear wheels (which may be replaced by timing belt) are the same size as each other, and mesh together to ensure that the nip rollers rotate at the same surface speed. The teeth of the rollers are sufficiently large that minor movements which occur in operation between the fixed and movable supports do not disengage these gear wheels.

Figure 4:
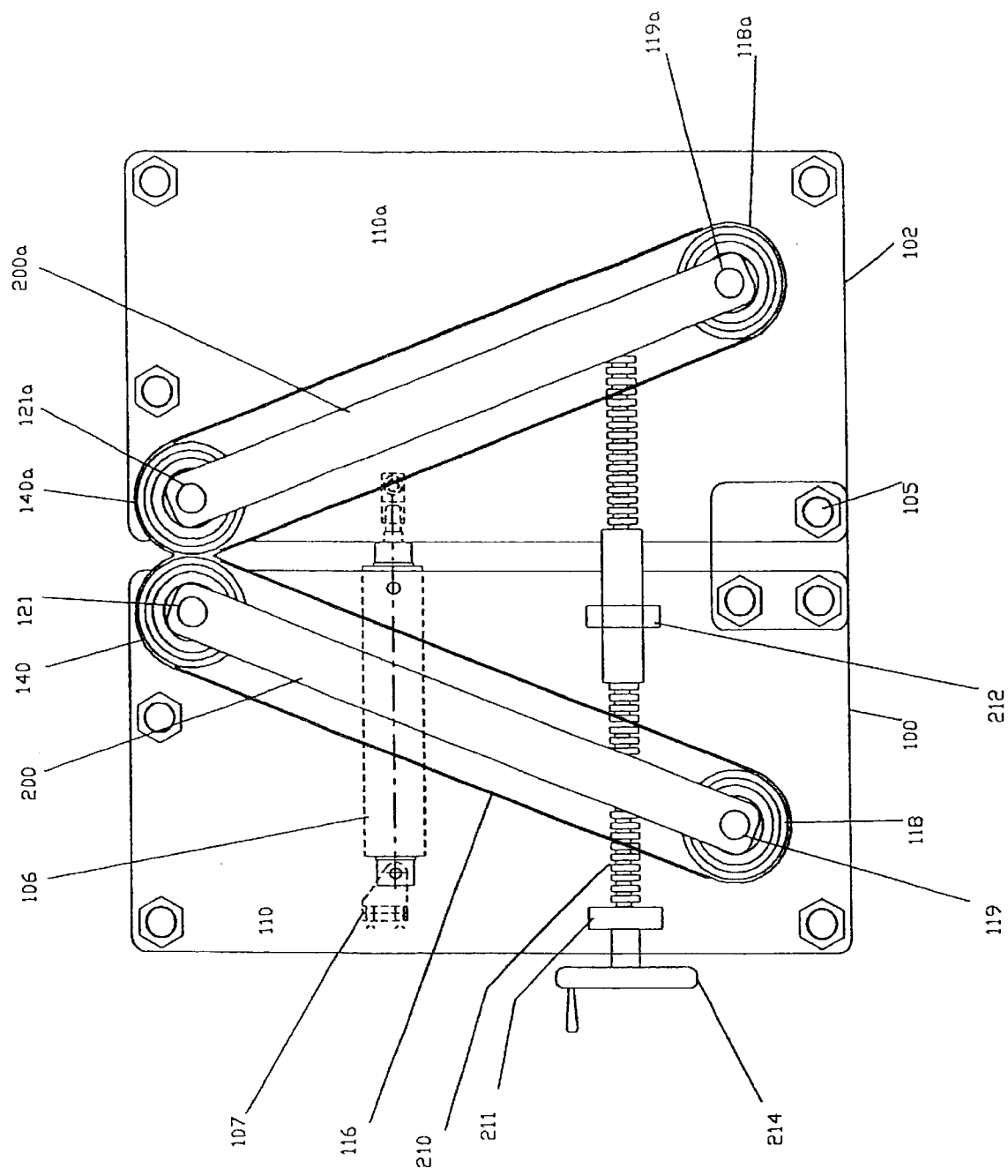

FIGS. 4 and 5 show a variation of the design of FIGS. 2 and 3, having the same fixed and movable supports 100 and 102, and other features which are the same as the previous embodiment and are indicated by the same reference numbers as in FIGS. 2 and 3; however in this case the first rollers 118 and 118a are only indirectly supported by the supports 100, 102. Here, the first roller shafts 119, 119a are held at the outer ends of arms pivoted at upper ends to the pinch roller shafts 121, 121a, these arms including front arms 200, 200a, and back arms 201, 201a. The separation between these arms, and therefore the separation of the first rollers, is controlled by a screw adjustment mechanism including a lead screw 210 supported by brackets 211, 212 held by the front plate 110 of the fixed support, and rotatable by a handle 214 accessible from a side of the fixed support. The lead screw has first and second threaded portions 210a and 210b which have opposite hand threads, these threaded portions passing through brackets 216 attached to the rear of the back arms 201, 201a. Clearly, rotation of the handle 214 in one sense causes the arms 201, 201a to move apart and rotation in the opposite sense permits the arms and the rollers to move back by themselves, thus adjusting the separation of the rollers 118 and 118a.

I claim:

1. Apparatus for producing plastic film comprising an annular die and means for extruding molten plastic through the die to form a tubular bubble, blowing means for supplying air into the bubble, and collapsing means for collapsing said bubble into a flat tube prior to passing the tube through a nip formed between rollers;

wherein said collapsing means includes opposed reaches of endless belts having their upstream ends held by a pair of first rollers spaced apart on opposite sides of the bubble, and having their downstream ends held by a pair of nip rollers which hold the belts together to form a nip for the collapsed tube;

further comprising drive means for rotatably interconnecting the pinch rollers and for ensuring that the belts entering said nip travel at the same surface speed; wherein said drive means include a pulley mounted to rotate with each of said nip rollers, and a single drive belt having an inside surface frictionally driving a first of the pulleys and having an outside surface frictionally driving the second of the pulleys; and wherein one of said first rollers and one of said nip rollers are each mounted on roller shafts carried by a first support, and another of said first rollers and another of said nip rollers are each mounted on roller shafts carried by a second support, and wherein said second support is movably mounted relative to said first support, said supports being connected by a power cylinder which urges together the two nip rollers.

2. Apparatus according to claim 1, wherein said nip rollers are larger in diameter than said first rollers.

3. Apparatus according to claim 1, wherein the two supports each carry an idler roller which contacts one of the endless belts to maintain tension in said belt.

4. Apparatus according to claim 1, wherein the apparatus is arranged for upwards extrusion of the plastic tube.

5. Apparatus for producing plastic film comprising an annular die and means for extruding molten plastic through the die to form a tubular bubble, blowing means for supplying air into the bubble, and collapsing means for collapsing said bubble into a flat tube prior to passing the tube through a nip formed between rollers, wherein said collapsing means comprises:

fixed and movable supports each supporting first and second roller shafts, said first roller shafts carrying a pair of first rollers and said second roller shafts carrying a pair of nip rollers, so that a combination of one first roller and one nip roller are supported by each of said supports, a said first roller carrying an upstream end of a first endless belt the downstream end of which is held by a said nip roller mounted on said fixed support, and another said first roller carrying an upstream end of a second endless belt the downstream end of which is held by a said nip roller mounted on said movable support, whereby opposed reaches of the endless belts can contact opposite sides of said tubular bubble to collapse it and pass it between said nip rollers;

power cylinder means connected between the two supports for applying pressure between said nip rollers;

further comprising drive means for rotatably interconnecting the nip rollers and for ensuring that the belts entering said nip travel at the same surface speed.

6. Apparatus according to claim 5, wherein the drive means include a gear wheel mounted to rotate with each of the nip rollers, said gear wheels being of the same size and meshing with each other to ensure that the nip rollers rotate at the same speed.

7. Apparatus according to claim 5, wherein said first rollers are mounted on shafts carried by the respective first and second supports.

8. Apparatus according to claim 5, wherein said first rollers are mounted on shafts carried by arms pivotally attached to said second roller shafts.

9. Apparatus according to claim 8, wherein said arms are connected to lead screw means usable to adjust the separation of said arms.

* * * * *